May 9, 1961     D. G. RAE     2,983,019
FASTENING DEVICE
Filed July 24, 1958     2 Sheets-Sheet 1
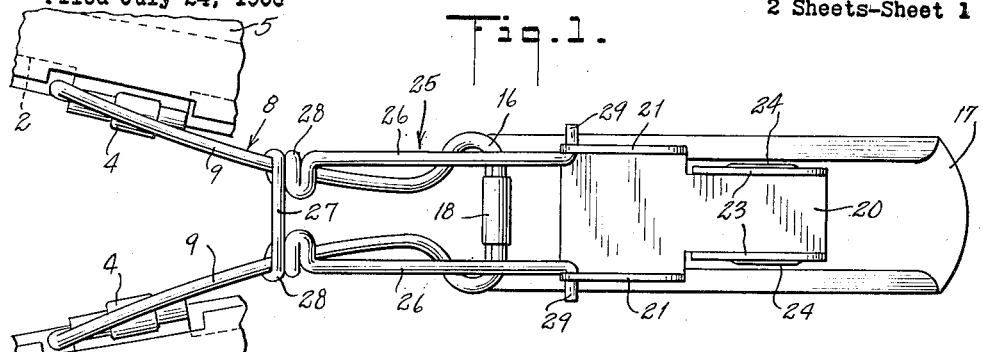
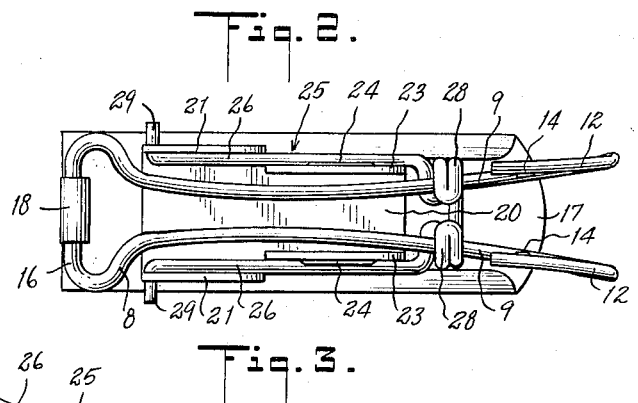
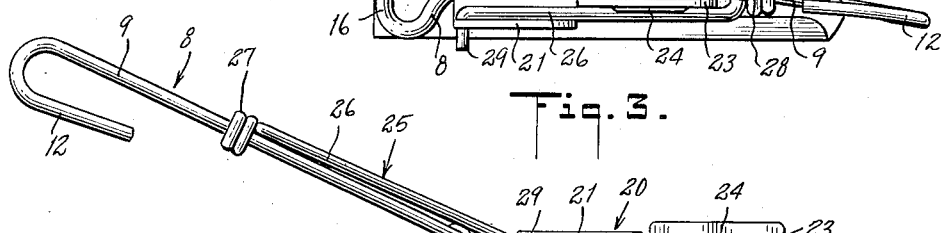
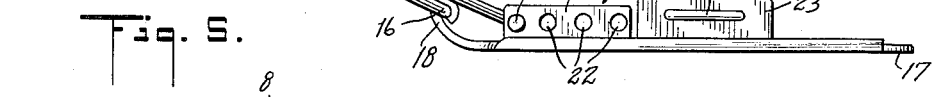
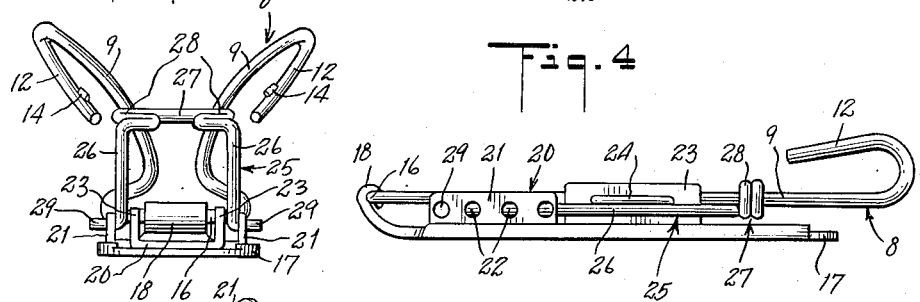
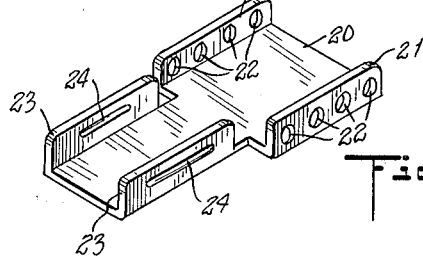
INVENTOR.
DAVID G. RAE
BY
R. E. Meech
ATTORNEY May 9, 1961  D. G. RAE  2,983,019
FASTENING DEVICE
Filed July 24, 1958  2 Sheets-Sheet 2
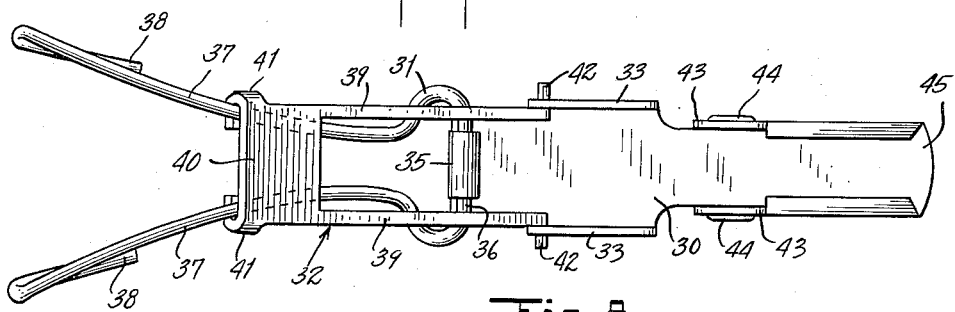
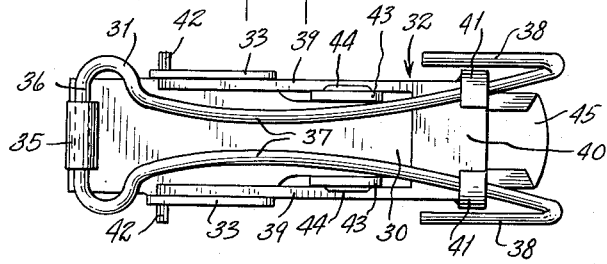
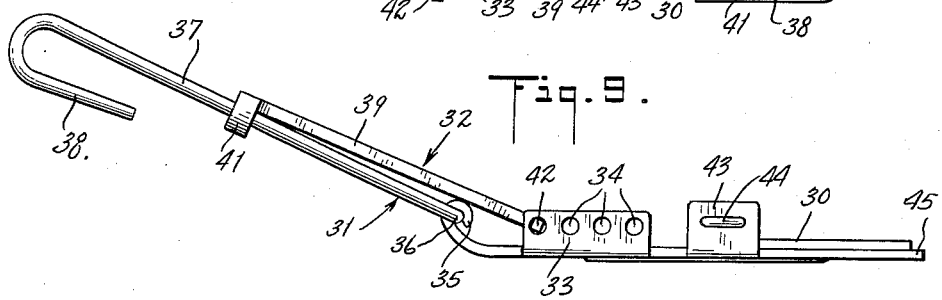
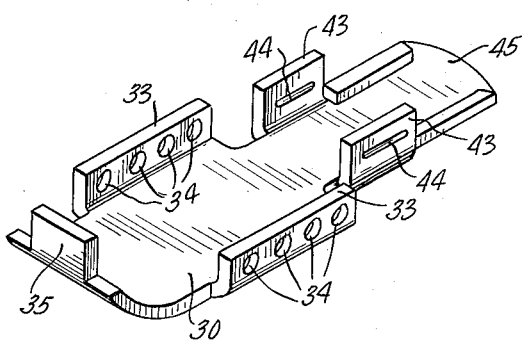
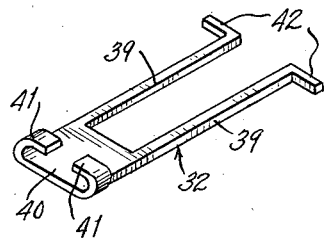
INVENTOR.
DAVID G. RAE
BY
R. E. Meech
ATTORNEY

United States Patent Office 2,983,019
Patented May 9, 1961

2,983,019
FASTENING DEVICE
David G. Rae, Meadville, Pa., assignor to Talon, Inc., a corporation of Pennsylvania Filed July 24, 1958, Ser. No. 750,690

8 Claims. (Cl. 24—207)

This invention relates to fastening devices particularly adaptable for shoes and the like of the type disclosed in the co-pending application of Clive B. Forrester, Serial No. 445,779, filed July 26, 1954.

In such a fastening device, there is provided generally a resilient wire member bent to substantially V-shape so as to provide a pair of spaced-apart arm-like portions integrally connected together at one end by a transversely extending trunnion portion. There is hingedly attached to this trunnion, a bearing-like portion arranged at one end of a manipulating or actuating member. Between the manipulating member and the resilient arm portion there is arranged an adjustable yoke-like member having one end thereof pivotally attached to the inner side of the manipulating member intermediate the length thereof. On the opposite end of this rigid member there is arranged a pair of spaced-apart hook-like portions which slidably engage the arm-like portions of the wire member whereby the arm-like portions are moved toward or away from one another upon movement of the manipulating member.

While the fastening device disclosed in the aforesaid Forrester application has proven to be practical and functions satisfactorily, it consists of a multiplicity of parts which are difficult and expensive to fabricate and assemble.

Accordingly, it is the general object of the present invention to provide an improved fastening device of the type disclosed in the aforesaid Forrester application consisting of a minimum number of parts which may be easily and inexpensively fabricated and assembled.

It is another object of the invention to provide an improved fastening device of the type described in which the yoke-like member can be easily and quickly adjusted relative to the manipulating member.

It is a further object of this invention to provide a fastening device of the type disclosed having improved means arranged therewith for securely locking the assembly in its closed position.

It is still another object of the present invention to provide an improved fastening device of the type described which is strong and rugged in its construction and efficient and effective in its use.

Various other objects and advantages of this invention will be more apparent in the course of the following specification, and will be particularly pointed out in the appended claims.

In the accompanying drawings, there is shown for the purpose of illustration, several embodiments which my invention may assume in practice.

In these drawings:

Fig. 1 is a plan view of the inner side of one embodiment of the fastening device in accordance with the present invention showing it in its open position and connected to the edges of an opening, Fig. 2 is a plan view of the fastening device, as shown in Fig. 1, showing it in its closed or locked position, Fig. 3 is a side view of the fastening device as shown in Fig. 1, Fig. 4 is a side view of the device as shown in Fig. 3, Fig. 5 is an end view of the device as shown in Fig. 1, Fig. 6 is a perspective view of the channeled plate-like member of the device shown in Fig. 1, Fig. 7 is a plan view of the inner side of another embodiment of the fastening device of my invention showing it in its open position, Fig. 8 is a plan view of the embodiment shown in Fig. 7, showing it in its closed or locked position, Fig. 9 is a side view of the embodiment as shown in Fig. 7, Fig. 10 is a perspective view of the plate-like manipulating member of the embodiment shown in Fig. 7, and Fig. 11 is a perspective view of the yoke-like member of the embodiment shown in Fig. 7.

Referring more particularly to the drawings, there is shown in Figs. 1 through 6, one embodiment of the improved fastening device of my invention. There is shown a pair of elongated substantially flat plate-like wing members 2 preferably made of relatively flat, thin metallic stock having cylindrical bearing-like portions 4 arranged along the inner marginal edges thereof for a purpose hereinafter to be described. These plate-like members 2 are adapted to be inserted in pockets bordering the opening between the flaps 5 of a shoe, as shown in Fig. 1.

Between these wing members 2, there is arranged a relatively stiff resilient wire member 8 made of spring steel or some other suitable material which is bent to substantially V-shape so as to provide arm portions 9, each of which terminate at the upper end thereof, preferably in a reversely bent portion 12 having a knob-like portion or teat 14 arranged adjacent the outer ends thereof. These reversely bent end portions 12 are removably disposed in the respective bearing-like portions or bosses 4 of the respective wing members 2. The lower ends of these arm portions 9 are integrally connected together by means of a substantially oval-shaped portion so as to provide a transversely extending trunnion portion 16.

In accordance with the present invention, there is provided a plate-like manipulating member 17 which preferably is relatively thin and substantially flat. The trunnion-like portion 16 of the resilient wire member 8 is hingedly connected to the inner end of this plate-like member 17, as at 18.

In this embodiment there is provided a channel-like member 20, as more clearly shown in Fig. 6, which is welded or otherwise secured to the inner face of the plate-like member 17. This yoke-like member has a pair of spaced-apart and opposed marginal flange portions 21 arranged at one end thereof. Each of these marginal flange portions has a row of spaced-apart apertures 22 therein with the apertures in one flange portion opposed to and in alignment with the apertures in the other flange portion. Forwardly of these flange portions 21, there is arranged another pair of spaced-apart and opposed marginal flange portions 23 which are spaced-apart from one another a distance less than the flange portions 21 are spaced from one another. On the outer side of each of these flange portions 23, there is formed an elongated embossment or protuberance 24 for locking the assembly in a manner hereinafter to be described.

There is provided a yoke-like member 25 which, as shown, is formed from wound wire. This yoke-like member consists of a pair of spaced-apart arm-like portions 26 interconnected at one end so as to provide a yoke-like portion 27 consisting of a pair of spaced-apart and opposed hook-shaped portions 28 which slidably engage with and are disposed around the respective arms 9 of the wire member 8.

On the opposite end of each of the arm-like portions 26 of this yoke-like member 25, there is arranged a transversely extending trunnion-like portion 29. The arm-like portions 26 extend between the marginal flange portions 21 and the trunnion-like portions 29 of the yoke-like member 25 and are positioned in any two opposed apertures 22 in these flange portions whereby that end of the yoke-like member is pivotally attached to these flange-like portions. The series of opposed apertures 22 are provided so that the yoke-like member 25 may be selectively adjusted in the assembly.

It will be understood that the hook-shaped portions 28 grasp the arms 9 of the resilient wire member 8 and draws them together as the yoke-shaped portion 27 of the yoke-like member 25 slides therealong thereby closing the opening. The yoke-like member 25 is actuated by the manipulating member 17 to which it is pivotally connected and it will be seen that the manipulating member makes the largest angle with both the resilient wire member 8 and yoke-like member 25 when the manipulating member is in its open position, as shown in Figs. 1, 3, and 5, thereby permitting the arms 9 to spread apart. In the closed or locked position, as shown in Figs. 2 and 4, it will be seen that the manipulating member 17 makes the smallest angle with both the resilient wire member 8 and the yoke-like member 25 and that it is disposed substantially parallel to both of these members when the assembly is fully closed thereby holding the arms 9 together against the inherent resilient characteristic thereof tending to spread them apart. In such closed position, it will be seen that the arm portions 26 of the yoke-like member 25 are forced over and disposed around the outer side flange portions 23 and are held in such closed or locked position by the embossments or protuberances 24 arranged therealong.

Attention is now directed to Figs. 7 through 11 of the drawings wherein there is shown a slight modification of the fastening device in accordance with the present invention. While the embodiment previously described was of a four piece construction, this embodiment consists merely of three pieces, namely, a channeled plate-like manipulating member 30, a resilient slide wire member 31 and a yoke-like member 32. There is arranged on the plate-like member 30 adjacent the one end thereof, a pair of spaced-apart marginal flange portions 33 with each having a row of apertures 34 arranged therein. On the extreme outer end of this plate-like member 30, there is an extending portion 35 which is bent to substantially cylindrical shape so as to provide a bearing for the transversely extending trunnion portion 36 of the wire member 31. The wire member 31 consists of a pair of spaced-apart arm portions 37 interconnected at one end by this transversely extending trunnion portion 36. The outer free ends of each of these arms 37 are bent reversely, as at 38, so as to provide hook-like portions on the free ends.

In this embodiment, the yoke-like member 32 is preferably formed from flat metallic stock and consists of a pair of spaced-apart arm-like portions 39 interconnected at one end by a yoke-like portion 40 having a pair of spaced-apart and opposed hook-shaped portions 41 arranged therewith. On the free end of each of these arm-like portions 39, there is arranged an outwardly and transversely extending trunnion portion 42. As before, these trunnion portions 42 are positioned in any two opposed apertures 34 in the flange portions 33 of the plate-like member 30 and the hook-like portions 41 are disposed slidably around the respective arms 37 of the wire member 31.

There is also arranged on the plate-like member 30 forwardly of the flange portions 33, another pair of marginal flange portions 43 with each having an elongated embossment or protuberance 44 arranged along the outer side thereof. These flange portions 43 are spaced apart from one another a distance less than the flange portions 33 are spaced from one another. There is arranged on the outer end of this plate-like member 30, an extension 45 for actuating the plate-like member and the assembly.

This embodiment functions in the same manner as the embodiment hereinbefore described.

As a result of my invention, it will be seen that the respective arm-like portions 26 and 39 of the respective embodiments are sprung over the respective protuberances 24 and 44 of the respective flange portions 23 and 43 thereby securely holding the arm-like portions in under the respective protuberances and the yoke-like member in locked position so as to prevent unintentional opening of the assembly. However, the arm-like portions of the yoke-like member will pass easily over the protuberances when the manipulating member is actuated to open the assembly.

While I have shown and described several embodiments which my invention may assume in practice, it will be understood that these embodiments are merely for the purpose of illustration and description and that other forms may be devised within the scope of my invention as defined in the appended claims.

What I claim as my invention is:

1. A fastening device of the class described comprising a plate-like manipulating member having a pair of spaced-apart opposed flange portions carried thereby, a resilient slide wire member bent to substantially V-shape having a transversely extending trunnion-like portion at one end thereof hingedly attached to the end of said plate-like member, means arranged on the outer free ends of the arms of said wire member for attaching said ends to the sides of the opening to be closed, a resilient wire yoke-like member having means arranged on one end thereof slidably engaging the arms of said wire member, means arranged on the opposite end of said yoke-like member pivotally and selectively attaching the same to said flange portions, and means carried by said plate-like member forwardly of said flange portions which co-operates with said yoke-like member for locking the plate-like member and the assembly in its closed position whereby the plate-like member is substantially parallel to the arms of said wire member and said yoke-like member.

2. A fastening device, as defined in claim 1, wherein the yoke-like member consists of a pair of spaced-apart arm-like portions interconnected at one end and having a pair of opposed transversely extending trunnion-like portions arranged on the opposite end thereof which are disposed in apertures in said flange portions, a yoke-like portion arranged at the interconnected end comprising a pair of hook-shaped portions with one disposed slidably around and co-operating with the respective arms of said wire member.

3. A fastening device, as defined in claim 2, wherein the means carried by the plate-like member forwardly of the flange portions which co-operate with the arm-like portions of the yoke-like member for locking the plate-like member and the assembly in its closed position consists of a pair of spaced-apart flange portions having a protuberance arranged on the sides thereof which co-operate with the arm-like portions of said yoke-like member.

4. A fastening device of the class described comprising a plate-like manipulating member having a pair of spaced-apart opposed flange portions carried thereby, each of said flange portions having a row of spaced-apart apertures arranged therein with the resepective apertures in one flange portion being opposed to and in alignment with those in the other flange portion, a resilient wire yoke-like member having a pair of transversely extending trunnion portions arranged on the inner end thereof which are disposed selectively in any two opposed apertures in said flange portions so as to be pivotally attached thereto, a resilient slide wire member bent to substantially V-shape, means arranged on the free outer ends of the arms of said wire member for attaching said ends to the sides of the opening to be closed, the inner end of said wire member having a transversely extending trunnion-like portion hingedly connected to the end of said plate-like member, means arranged on the outer end of said yoke-like member slidably engaging the arms of said wire member, and means carried by said plate-like member forwardly of said flange portions which co-operates with said yoke-like member for locking the plate-like member and the assembly in its closed position whereby the plate-like member is substantially parallel to the arms of said wire member and said yoke-like member.

5. A fastening device, as defined in claim 4, wherein the means arranged on the outer end of the yoke-like member slidably engaging the arms of the wire member consists of a pair of hook-shaped portions disposed slidably around and co-operating with the respective arms of said wire member.

6. A fastening device, as defined in claim 5, wherein the means carried by the plate-like member forwardly of the flange portions which co-operate with the arm-like portions of the yoke-like member for locking the plate-like member and the assembly in its closed position consists of a pair of spaced-apart flange portions having a protuberance arranged on the sides thereof which co-operate with the arm-like portions of said yoke-like member.

7. A fastening device of the class described comprising a plate-like manipulating member having a pair of spaced-apart opposed flange portions carried thereby, each of said flange portions having a row of spaced-apart apertures arranged therein with the respective apertures in one flange portion being opposed to and in alignment with those in the other flange portion, a resilient wire yoke-like member having a pair of transversely extending trunnion portions arranged on the inner end thereof which are disposed selectively in any two opposed apertures in said flange portions so as to be pivotally attached thereto, a resilient slide wire member bent to substantially V-shape, means arranged on the free outer ends of the arms of said wire member for attaching said ends to the sides of the opening to be closed, the inner end of said wire member having a transversely extending trunnion-like portion hingedly connected to the end of said plate-like member, means arranged on the outer end of said yoke-like member slidably engaging the arms of said wire member, and another pair of spaced-apart opposed flange portions carried by said plate-like member forwardly of said first mentioned flange portions and being spaced apart from one another a distance less than said first mentioned flange portions are spaced from one another, each of said last mentioned flange portions having an elongated protuberance arranged on the outer side thereof with which the respective arm-like portions of said yoke-like member co-operate to lock the plate-like member and the assembly in its closed position whereby the plate-like member is substantially parallel to the arms of said wire member and the arm-like portions of said yoke-like member.

8. A fastening device of the class described comprising a plate-like manipulating member having a pair of spaced-apart opposed flange portions carried thereby, each of said flange portions having a row of spaced-apart apertures arranged therein with the resepective apertures in one flange portion being opposed to and in alignment with those in the other flange portion, a resilient slide wire member bent to substantially V-shape having a transversely extending trunnion-like portion at one end thereof hingedly attached to the end of said plate-like member, means arranged on the free outer ends of the arms of said wire member for attaching said ends to the sides of the opening to be closed, a resilient wire yoke-like member consisting of a pair of spaced-apart arm-like portions interconnected at one end and having a pair of hook-shaped portions arranged at said end with one disposed slidably around and co-operating with the respective arms of said wire member, the arm-like portions of said yoke-like member extending between said flange portions and having a pair of transversely and oppositely extending trunnion portions arranged on the inner end thereof which are disposed selectively in any two opposed apertures in said flange portions so as to be pivotally attached thereto, and another pair of spaced-apart opposed flange portions carried by said plate-like member forwardly of said first mentioned flange portions and being spaced apart from one another a distance less than said first mentioned flange portions are spaced from one another, each of said last mentioned flange portions having an elongated protuberance arranged on the outer side thereof with which the respective arm-like portions of said yoke-like member co-operate to lock the plate-like member and the assembly in its closed position whereby the plate-like member is substantially parallel to the arms of said wire member and the arm-like portions of said yoke-like member.

References Cited in the file of this patent
UNITED STATES PATENTS

| | | |
|---|---|---|
| 2,270,937 | Doering | Jan. 27, 1942 |
| 2,584,215 | Marien | Feb. 5, 1952 |
| 2,637,087 | Forrester | May 5, 1955 |